United States Patent
Griffith

(10) Patent No.: US 12,374,228 B2
(45) Date of Patent: Jul. 29, 2025

(54) SYSTEMS AND METHODS FOR CONDUCTING FIXED-BASE OPERATOR (FBO) AVIATION SERVICES USING A PORTABLE ELECTRONIC DEVICE

(71) Applicant: Gregory M. Griffith, Holland, MI (US)

(72) Inventor: Gregory M. Griffith, Holland, MI (US)

( * ) Notice: Subject to any disclaimer, the term of this patent is extended or adjusted under 35 U.S.C. 154(b) by 248 days.

(21) Appl. No.: 17/693,625

(22) Filed: Mar. 14, 2022

(65) Prior Publication Data
US 2023/0290252 A1 Sep. 14, 2023

(51) Int. Cl.
| | |
|---|---|
| G08G 5/26 | (2025.01) |
| B64F 5/40 | (2017.01) |
| G06Q 10/0631 | (2023.01) |
| G08G 5/22 | (2025.01) |
| G08G 5/56 | (2025.01) |

(52) U.S. Cl.
CPC ............ *G08G 5/26* (2025.01); *B64F 5/40* (2017.01); *G08G 5/22* (2025.01); *G08G 5/56* (2025.01); *G06Q 10/063114* (2013.01)

(58) Field of Classification Search
None
See application file for complete search history.

(56) References Cited

U.S. PATENT DOCUMENTS

| | | | |
|---|---|---|---|
| 6,003,808 A | 12/1999 | Nguyen et al. | |
| 6,438,468 B1 | 8/2002 | Muxlow et al. | |
| 6,885,921 B1 | 4/2005 | Farmer | |
| 8,321,083 B2 | 11/2012 | Beebe et al. | |
| 8,483,356 B2 | 7/2013 | Bendahan | |
| 8,571,747 B2 | 10/2013 | Zimpfer et al. | |
| 8,930,068 B1 * | 1/2015 | Helder | B64F 5/40 |
| | | | 707/609 |
| 9,002,571 B1 * | 4/2015 | Gribble | G06Q 10/0637 |
| | | | 701/33.2 |
| 9,952,593 B2 | 4/2018 | Colin et al. | |
| 10,053,236 B1 | 8/2018 | Buchmueller et al. | |
| 10,081,443 B2 | 9/2018 | Engel et al. | |

(Continued)

FOREIGN PATENT DOCUMENTS

| | | | | |
|---|---|---|---|---|
| CN | 112734113 A | * | 4/2021 | ........... G06F 16/903 |
| EP | 1426870 | | 6/2004 | |

*Primary Examiner* — Christian Chace
*Assistant Examiner* — Shayne M. Gilbertson
(74) *Attorney, Agent, or Firm* — King & Partners, PLC

(57) ABSTRACT

A method for conducting fixed-base operator aviation services using a portable electronic device, including the steps of: providing a portable electronic device; establishing a user identity via the GUI; optionally observing an inspection dashboard; establishing aircraft identity and location via the GUI; defining an aviation service having a standard operating procedure to be carried out by the user via the GUI; prompting the user to collect at least one objective and/or subjective data input corresponding to the standard operating procedure of the aviation service being carried out by the user via the GUI; recording the date and time the data input was collected; storing the collected data on the portable electronic device and/or uploading the collected data to a cloud-based server; and validating whether or not the user complied with the standard operating procedure of the aviation service that was carried out.

3 Claims, 15 Drawing Sheets

(56) References Cited

U.S. PATENT DOCUMENTS

| | | | |
|---|---|---|---|
| 10,107,767 B1 | 10/2018 | Laughlin et al. | |
| 2003/0003872 A1 | 1/2003 | Brinkley et al. | |
| 2003/0233178 A1 | 12/2003 | Sinex | |
| 2008/0147263 A1 | 6/2008 | Sinex | |
| 2008/0208458 A1* | 8/2008 | Wu | G09B 29/10 |
| | | | 701/532 |
| 2008/0301152 A1* | 12/2008 | Kollgaard | G07C 5/008 |
| 2009/0043782 A1* | 2/2009 | Otake | G06Q 40/08 |
| 2010/0042445 A1* | 2/2010 | Nicosia | G06Q 50/40 |
| | | | 715/810 |
| 2010/0153168 A1 | 6/2010 | York et al. | |
| 2014/0168420 A1 | 6/2014 | Naderhirn et al. | |
| 2016/0229562 A1* | 8/2016 | Kathirvel | H04R 1/028 |
| 2016/0328978 A1 | 11/2016 | Ramaker et al. | |
| 2017/0347233 A1* | 11/2017 | Glatfelter | B64F 5/40 |
| 2018/0170574 A1* | 6/2018 | Kahn | G07C 5/0841 |
| 2020/0074762 A1 | 3/2020 | Culpin | |
| 2020/0279214 A1* | 9/2020 | Hochman | G06F 16/248 |
| 2021/0327296 A1* | 10/2021 | Klatt | G09B 19/003 |
| 2022/0391853 A1* | 12/2022 | Seymour | G06Q 10/20 |
| 2023/0281726 A1* | 9/2023 | Butara | G08G 5/0082 |
| | | | 701/521 |

\* cited by examiner

Fig. 3.1

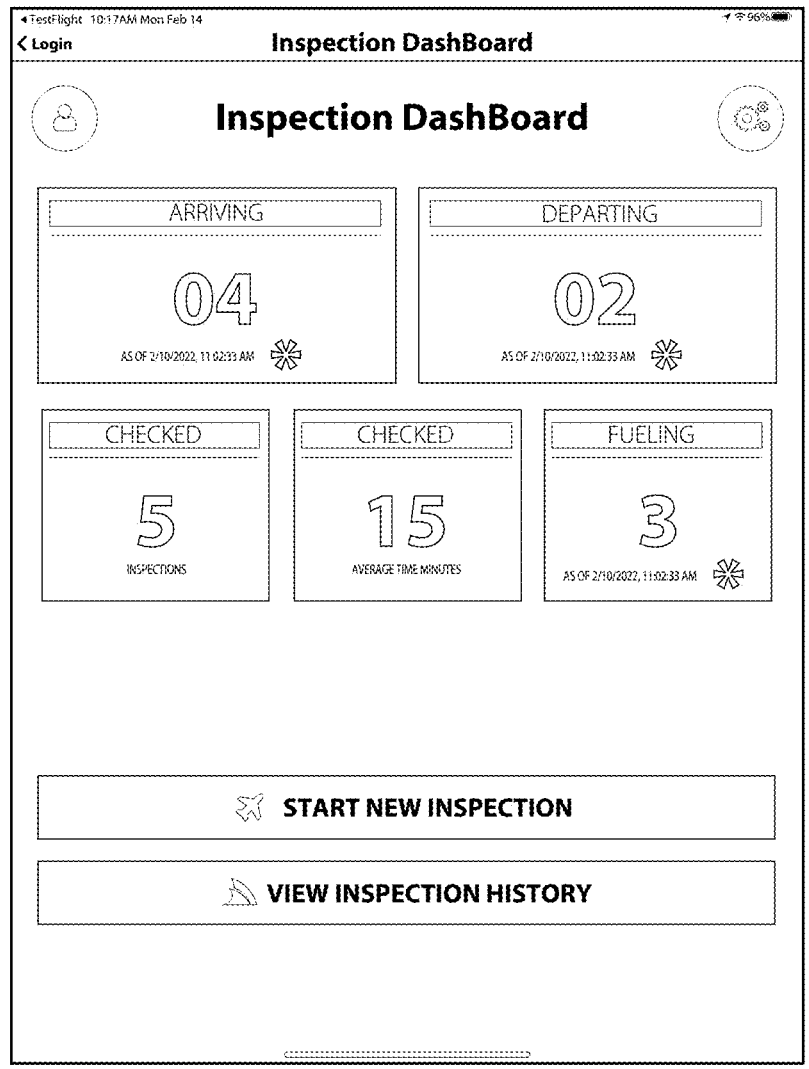
Fig. 3.2

*Fig. 3.3*

Fig. 3.4

*Fig. 3.5*

Fig. 3.6

*Fig. 3.7*

*Fig. 3.8*

Fig. 3.11

*Fig. 3.12*

SYSTEMS AND METHODS FOR CONDUCTING FIXED-BASE OPERATOR (FBO) AVIATION SERVICES USING A PORTABLE ELECTRONIC DEVICE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to systems and methods for conducting fixed-base operator (FBO) aviation services (e.g., aircraft arrival, departure, inspection, maintenance, fueling, towing, parking, hangaring, etcetera) using a portable electronic device (e.g., smart phone, Apple iPhone, Samsung Galaxy, tablet, Apple iPad, Microsoft Surface Pro, etcetera), and, more particularly, to those that enable an FBO to: (1) validate FBO personnel or operator compliance with one or more standard operating procedures or tasks; (2) obtain, document, store, and report an aircraft's status and condition at a specific time, date, and location; and (3) maximize the FBO's operational efficiency.

2. Background Art

Systems and methods associated with aviation services, such as aircraft maintenance and inspection, have been known in the art for years and are the subject of several patents and publications, including: U.S. Pat. No. 10,107,767 entitled "Aircraft Inspection System with Visualization and Recording," U.S. Pat. No. 10,081,443 entitled "Aircraft Inspection System," U.S. Pat. No. 9,952,593 entitled "Collaborative Robot for Visually Inspecting an Aircraft," U.S. Pat. No. 8,571,747 entitled "System and Method for Managing Aircraft Maintenance," U.S. Pat. No. 8,483,356 entitled "Mobile Aircraft Inspection System," U.S. Pat. No. 8,321,083 entitled "Aircraft Maintenance Laptop," U.S. Pat. No. 6,003,808 entitled "Maintenance and Warranty Control System for Aircraft," United States Patent Application Publication Number 2020/0074762 entitled "Method and System for Avionics Component Maintenance," United States Patent Application Publication Number 2010/0153168 entitled "System and Method for Carrying Out an Inspection or Maintenance Operation with Compliance Tracking Using a Handheld Device," United States Patent Application Publication Number 2008/0147263 entitled "Electronic Maintenance Work Cards," United States Patent Application Publication Number 2003/0233178 entitled "Aircraft Maintenance Program Manager," and European Patent Number 1,426,870 entitled "Remote Aircraft Manufacturing, Monitoring, Maintenance and Management System"—all of which are hereby incorporated herein by reference in their entirety including all references cited therein.

U.S. Pat. No. 10,107,767 appears to disclose a method, system, and apparatus for a vehicle inspection system that includes a mobile inspection device, a display system, a graphical user interface configured to be displayed on the display system, and a controller. The controller is configured to identify a position of the mobile inspection device within a vehicle and receives a user input comprising a group of gestures made by a human operator with respect to an item in a group of items in a field of view of the mobile inspection device based on the position of the mobile inspection device. The controller creates a note at a location with respect to the vehicle in association with the item in the field of view of the mobile inspection device in which the note is assigned to the location with respect to the vehicle and displays the note on the graphical user interface for the mobile inspection device.

U.S. Pat. No. 10,081,443 appears to disclose a simplified inspection of an aircraft for the pilot, an aircraft inspection system which includes at least one movable inspection unit, a position detection arrangement, and at least one data transfer interface. The at least one moveable inspection unit is moveable relative to an aircraft to be inspected. The at least one movable inspection unit includes at least one sensor for detecting a characteristic value, for verifying a characteristic and/or for determining a defect of an aircraft. The movable inspection unit is configured to generate monitoring data. When a defect or a characteristic value is detected, the position detection arrangement detects position data of the movable inspection unit in relation to the aircraft to be inspected, and assigns the position data to the monitoring data. The data transfer interface provides the position data with the assigned monitoring data as inspection data.

U.S. Pat. No. 9,952,593 appears to disclose a device for visually inspecting the external surfaces of an aircraft that includes an inspection area to receive an aircraft, at least one visual inspection robot, and a control center. A movable platform of the robot supports a turret having an observation unit. The robot includes a processing unit which guides the movable platform and process the data received from the observation unit. The processing unit of the robot are configured to autonomously control the robot during the visual inspection of the external surfaces of the aircraft parked in the inspection area; to interrupt a visual inspection in the event of a detection of an anomaly on the external surface of the aircraft; to transmit a visual inspection data to the control center; and to receive instructions from the control center.

U.S. Pat. No. 8,571,747 appears to disclose a method of managing maintenance of an aircraft. In one implementation the method includes generating an electronic report that indicates a fault of the aircraft; electronically integrating the electronic report with resource data and flight schedule data to establish a repair solution for the fault; and generating an electronic work order based on the repair solution.

U.S. Pat. No. 8,483,356 appears to disclose a system for scanning aircraft for concealed threats. The system comprises a vehicle and a manipulator arm attached with a scanning head that can be maneuvered in multiple directions to completely scan an aircraft from the outside. The system uses transmission-based X-ray detection, backscatter-based X-ray detection or a combination thereof, in various embodiments. The system also includes gamma-ray and neutron detectors, for detection of nuclear and radioactive materials.

U.S. Pat. No. 8,321,083 appears to disclose an apparatus that includes a portable computer, and program code stored on the portable computer. The program code is capable of being executed to establish a communications link with an aircraft network data processing system in an aircraft, obtain information about the aircraft over the communications link, display the information on a display device for the portable computer, receive user input to control a data processing system on the aircraft network data processing system in the aircraft, and send a number of commands to the data processing system in response to receiving the user input.

U.S. Pat. No. 6,003,808 appears to disclose a system that provides engine maintenance information automatically from fault code data received from an onboard engine performance monitoring computer. The maintenance information is provided by an HTML repair guide electronically called by the control system using the fault code as part of the page address in the HTML guide. The control system automatically ensures that all fault codes are responded to, i.e., that maintenance personnel carry out the appropriate maintenance actions in response to each and every fault code, with a view to improve quality assurance of maintenance. Maintenance actions of maintenance personnel are automatically recorded for the purposes of validating and/or generating warranty claim applications. The system also has a warranty claim report generator for processing aircraft maintenance action log data. The generator has a warranty action discriminator for reading the action log data and outputting data representing possible warranty covered actions, and a warranty action validator receiving the possible warranty covered actions data and engine performance data for outputting data representing warranty claim actions. The warranty claim actions data are processed to produce warranty claim report output data.

United States Patent Application Publication Number 2020/0074762 appears to disclose a method and system for component maintenance including for avionics components including a light assembly provided at a component, the light assembly configured to provide an output indicative of a status of the component and a mobile device having a display and an optical sensor and configured to determine light emitted from the light assembly and determine the status of the component to define a determined status based on light intensity.

United States Patent Application Publication Number 2010/0153168 appears to disclose a system and method for inspections and compliance verification of industrial equipment using a handheld device. An inspector first segments an inspected component into logical inspection points. The inspector then scans a unique machine-readable tag, such as an RFID tag, with a handheld device at each logical inspection point. The inspector then takes a media sample, such as a digital photograph, of the physical component referred to by each corresponding logical inspection point. Then the inspector associates the media samples with the corresponding scan of the unique machine-readable tag. For each of the actions the inspector carries out on the handheld device, a timestamp is added that represents evidence of a date and a time of physical visitation to the associated logical inspection point. The inspector may then annotate the media samples in such ways that substantiate inspector statements of problems with inspected components found during inspection.

United States Patent Application Publication Number 2008/0147263 appears to disclose a method for electronically documenting the completion of maintenance tasks in a maintenance industry which requires recordation of maintenance tasks performed, and in which required maintenance tasks are documented on a plurality of work cards, the method includes retrieving a legacy work card that is an electronic document itemizing a plurality of maintenance tasks to be performed and specifying by skill level whom may perform the itemized maintenance tasks, creating, from the legacy work card, an electronic work card including a plurality of data entry fields that include at least a sign-off field, receiving data corresponding to a designated data entry field, and modifying the electronic work card to include the received data corresponding to the designated data entry field.

United States Patent Application Publication Number 2003/0233178 appears to disclose a system for managing an aircraft maintenance program for an aircraft operated by an operator that includes means for extracting maintenance tasks for the aircraft from at least one aircraft maintenance document, means for sorting the maintenance tasks into initial maintenance task groups having common control points, and means for guiding the airline operator to organize the maintenance tasks and initial maintenance task groups into a plurality of maintenance task groups.

European Patent Number 1,426,870 appears to disclose an aircraft wireless data communication system that includes an aircraft computer/server in communication with a plurality of aircraft systems. Access to the aircraft systems via the computer/server is available in real-time via wireless communication with a ground-based computer system. The ground-based computer system includes a computer that can be accessed from one or more networks of computers. Each authorized computer user on an airline, manufacturer, or supplier network has remote real-time access to the aircraft computer/server. Properly authorized remote users can: perform comparisons between the aircraft actual configuration identity and an aircraft authorized configuration identity; perform system diagnostic testing; view system status and parameters; collaborate with users from local and remote organizations using real-time aircraft data; and upload and download software and data to and from aircraft systems.

While the above-identified patents and publications do appear to disclose various systems and methods associated with aviation services, they remain non-desirous and/or problematic inasmuch as, among other things, none of the above-identified systems and methods use a portable electronic device that enables an FBO to: (1) validate FBO personnel or operator compliance with one or more standard operating procedures or tasks; (2) obtain, document, store, and report an aircraft's status and condition at a specific time, date, and location; and (3) maximize the FBO's operational efficiency.

These and other objects of the present invention will become apparent in light of the present specification, claims, and drawings.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present invention is directed to a method for conducting fixed-base operator (FBO) aviation services (e.g., aircraft arrival, departure, inspection, maintenance, fueling, towing, parking, hangaring, repositioning, etcetera) using a portable electronic device (e.g., smart phone, Apple iPhone, Samsung Galaxy, tablet, Apple iPad, Microsoft Surface Pro, etcetera), comprising the steps of, consisting essentially of the steps of and/or consisting of the steps of: (a) providing a portable electronic device, wherein the portable electronic device is adapted to execute software that displays a graphical user interface (GUI); (b) establishing a user identity via the GUI; (c) optionally observing an inspection dashboard; (d) establishing aircraft identity and location via the GUI; (e) defining an aviation service having a standard operating procedure to be carried out by the user via the GUI; (f) prompting the user to collect at least one objective and/or subjective data input corresponding to the standard operating procedure of the aviation service being carried out by the user via the GUI; (g) recording the date and time the data input was collected; (h) storing the collected data on the portable electronic device and/or uploading the collected data to a cloud-based server; and (i) validating whether or not the user complied with the standard operating procedure of the aviation service that was carried out.

In a preferred embodiment of the present invention, the method further comprises the step of generating a status update of the aircraft at a specific date, time, and location.

In another preferred embodiment of the present invention, the method further comprises the step of communicating the status update of the aircraft to one or more of the FBO's supervisor, the aircraft's pilot(s), the aircraft's passenger(s), and the aircraft's owner(s).

In yet another preferred embodiment of the present invention, the method further comprises the step of prioritizing future aviation services to be carried out on one or more aircraft based on the generated status update, and, in turn increasing the FBO's operational efficiency.

In one preferred embodiment of the present invention, the step of establishing the user identity via the GUI includes the user providing his/her email, username, and/or unique identification number in combination with a password.

In a preferred implementation of the present invention, the step of optionally observing the inspection dashboard includes one or more of observing the number of arriving flights, departing flights, aircraft checked, aircraft inspected, and aircraft needing fuel and/or maintenance.

In another preferred implementation of the present invention, the step of establishing the aircraft's identity and location via the GUI includes the step of the user inputting one or more of the aircraft's tail number, airport name, hangar name, gate number, GPS location, and make and/or model of the aircraft.

In yet another preferred implementation of the present invention, the step of defining the aviation service having a standard operating procedure to be carried out by the user via the GUI includes at least one of selecting aircraft arrival, aircraft departure, aircraft inspection, aircraft maintenance, aircraft fueling, aircraft towing, aircraft parking, aircraft hangaring, and aircraft repositioning.

In a preferred embodiment of the present invention, the step of prompting the user to collect objective and/or subjective data input corresponding to the standard operating procedure of the aviation service being carried out by the user via the GUI includes prompting for a checkpoint condition of good, caution, or bad.

In another preferred embodiment of the present invention, the step of prompting the user to collect objective and/or subjective data input corresponding to the standard operating procedure of the aviation service being carried out by the user via the GUI includes prompting for a photo and/or video of at least a portion of the aircraft.

In yet another preferred embodiment of the present invention, the step of prompting the user to collect objective and/or subjective data input corresponding to the standard operating procedure of the aviation service being carried out by the user via the GUI includes prompting for an audio notation.

In one preferred embodiment of the present invention, the step of recording the date and time the data input was collected includes generating date and time data that is observable without opening the data record or file.

In a preferred implementation of the present invention, the step of storing the collected data on the portable electronic device includes generating a data record or file that includes embedded photos, videos, and/or audio notations and/or external links to the same stored on a data server.

In another preferred implementation of the present invention, the step of validating whether or not the user complied with the standard operating procedure of the aviation service that was carried out includes a positive affirmation from the user that each required action was properly carried out.

The present invention is also directed to a system, comprising, consisting essentially of and/or consisting of: (a) a processor; and (b) a memory for storing executable instructions, the processor executing the instructions to: (1) display a graphical user interface (GUI) that comprises an input interface that receives data that comprises user-selected content and at least one aircraft image; (2) receive the user-selected content and the at least one aircraft image; (3) convert, on-demand, the user-selected content and the at least one aircraft image into a digital record by combining the user-selected data and the at least one aircraft image with a templated media; and (4) output, on-demand, the digital record for at least one of: validating FBO personnel or operator compliance with one or more standard operating procedures or tasks; obtaining, documenting, storing, and reporting an aircraft's status and condition at a specific date, time, and location; and increasing the FBO's operational efficiency.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted.

It will be further understood that the invention is not necessarily limited to the particular embodiments illustrated herein.

Figure 1:
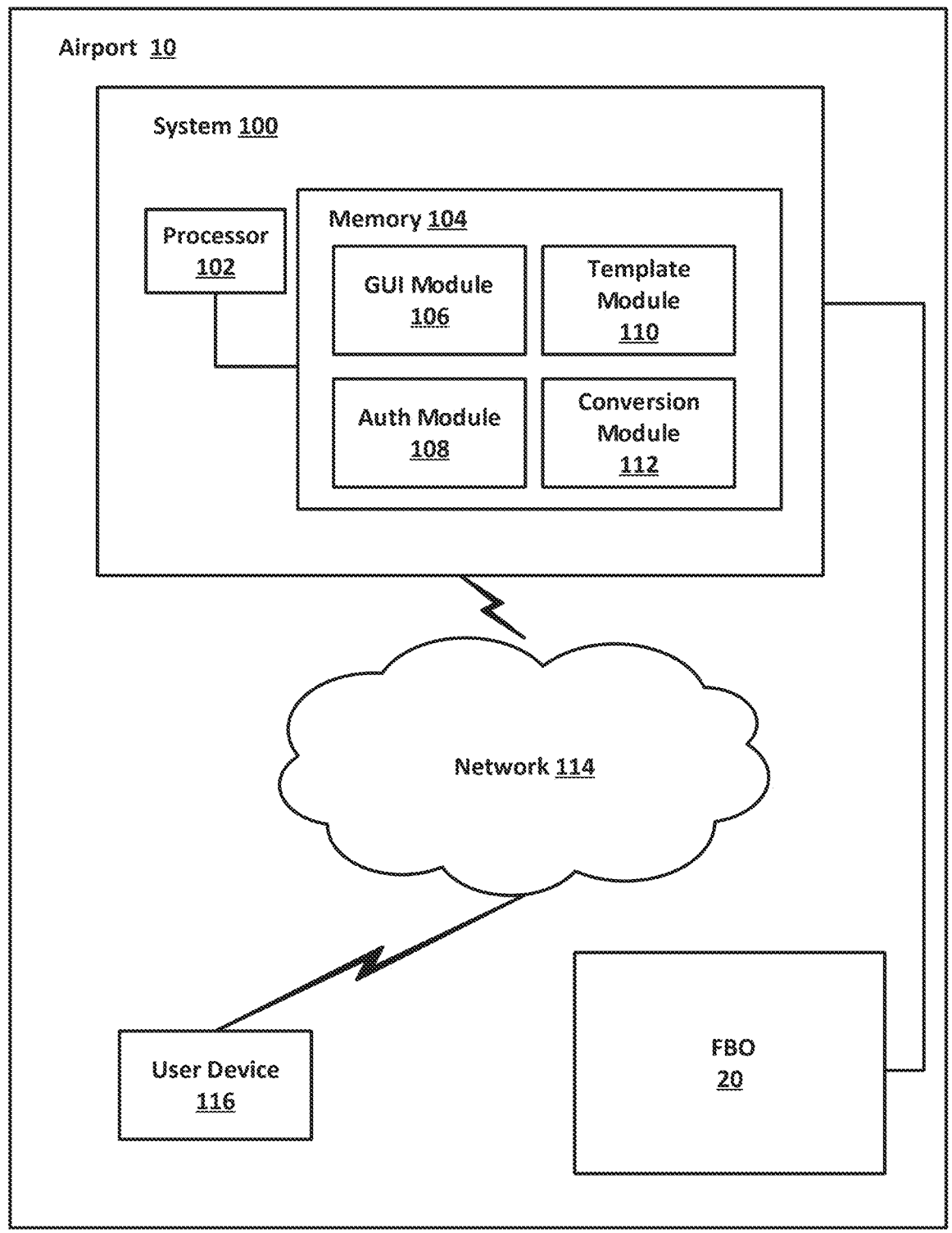
Figure 2:
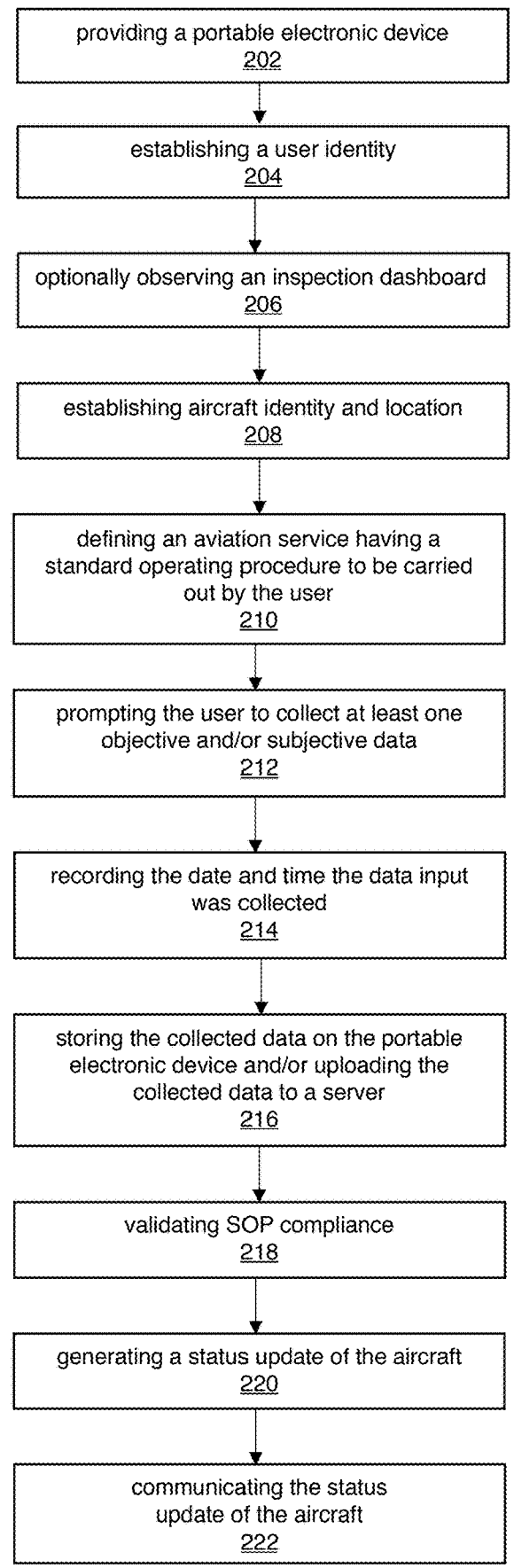
Figure 4:
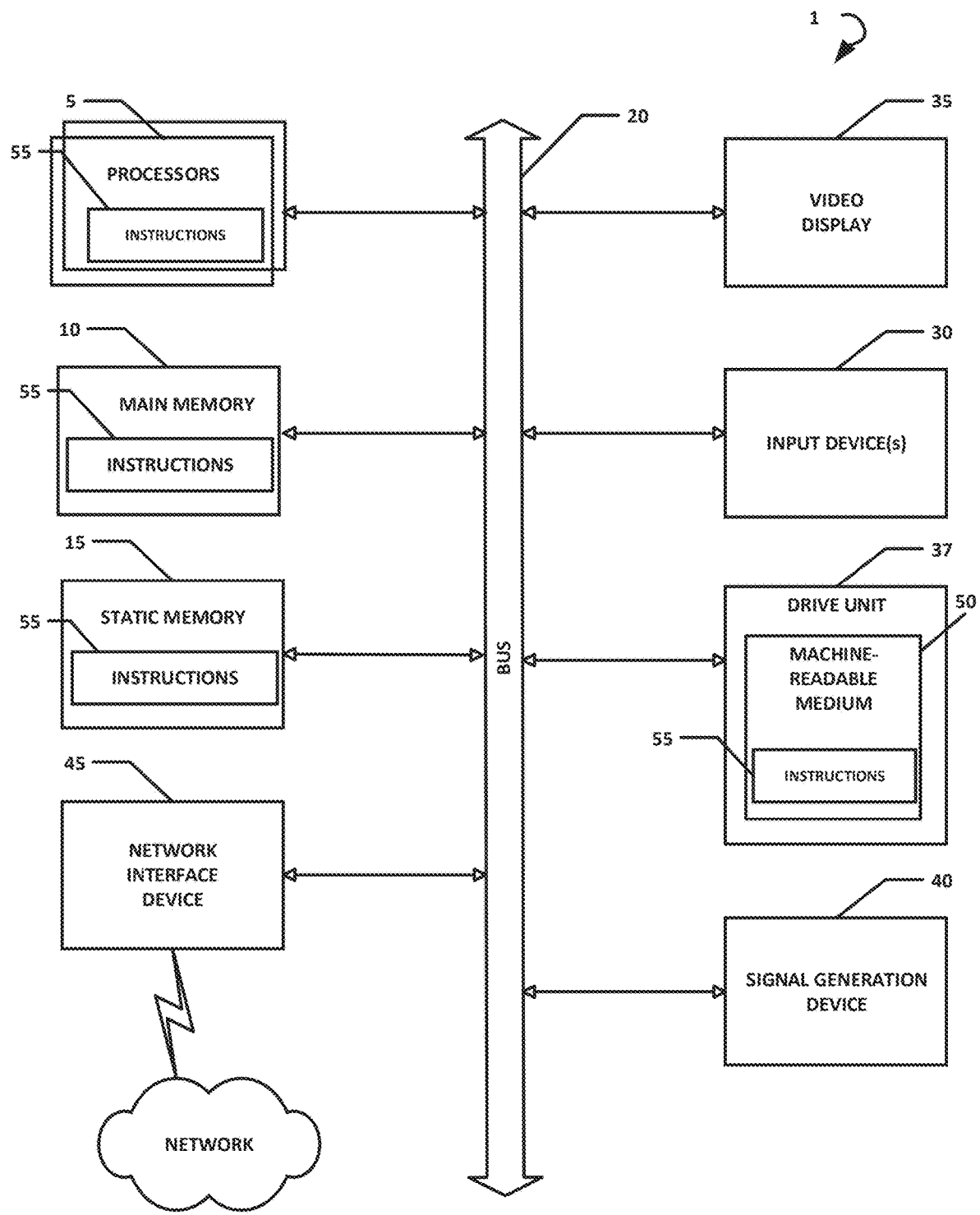

The invention will now be described with reference to the drawings wherein:

FIG. 1 is a schematic diagram of an example computing architecture constructed in accordance with the present disclosure;

FIG. 2 is a flowchart of an example method of the present disclosure;

FIGS. 3.1-3.12 collectively illustrate various screenshots of example GUIs that are provided to allow users to interact with the systems of the present disclosure; and FIG. 4 illustrates an exemplary computing system that may be used to implement embodiments according to the present disclosure.

DETAILED DESCRIPTION OF THE INVENTION

While this invention is susceptible of embodiment in many different forms, there is disclosed and described herein in detail several specific embodiments with the understanding that the present disclosure is to be considered as an exemplification of the principles of the invention and is not intended to limit the invention to the embodiments illustrated.

In general, the present disclosure is directed to systems and methods for conducting fixed-base operator (FBO) aviation services (e.g., aircraft arrival, departure, inspection, maintenance, fueling, towing, parking, hangaring, repositioning, etcetera) using a portable electronic device (e.g., smart phone, Apple iPhone, Samsung Galaxy, tablet, Apple iPad, Microsoft Surface Pro, etcetera) that enable an FBO to: (1) validate FBO personnel or operator compliance with one or more standard operating procedures or tasks; (2) obtain, document, store, and report an aircraft's status and condition at a specific time, date, and location; and/or (3) maximize the FBO's operational efficiency.

In one implementation of the present invention, the method comprises the steps of: (a) providing a portable electronic device, wherein the portable electronic device is adapted to execute software that displays a graphical user interface (GUI); (b) establishing a user identity via the GUI; (c) optionally observing an inspection dashboard; (d) establishing aircraft identity and location via the GUI; (e) defining an aviation service having a standard operating procedure to be carried out by the user via the GUI; (f) prompting the user to collect at least one objective and/or subjective data input corresponding to the standard operating procedure of the aviation service being carried out by the user via the GUI; (g) recording the date and time the data input was collected; (h) storing the collected data on the portable electronic device and/or uploading the collected data to a cloud-based server; and (i) validating whether or not the user complied with the standard operating procedure of the aviation service that was carried out.

Preferably, the method further comprises the step of generating a status update of the aircraft at a specific date, time, and location and/or the step of communicating the status update of the aircraft to one or more of the FBO's supervisor, the aircraft's pilot(s), the aircraft's passenger(s), and the aircraft's owner(s).

In another preferred implementation of the present invention, the method further comprises the step of prioritizing future aviation services to be carried out on one or more aircraft based on the generated status update, and, in turn increasing the FBO's operational efficiency.

Referring now to FIG. 1, an example system 100 (system for conducting fixed-base operator (FBO) aviation services) is located in an airport 10. In general, the airport 10 includes at least one FBO 20 where aviation services are carried out. Additional aspects of the system 100 can be found with respect to the computing system of FIG. 4.

In some embodiments, the system 100 comprises a processor 102 and memory 104. The memory 104 comprises logic and executable instructions that when executed by the processor 102 cause the system 100 to perform the various methods and functionalities described herein. In some embodiments, the system 100 generates customized operational and/or inspection dashboards from user-selected input(s) and other data or constraints described herein.

In one embodiment, the memory 104 stores executable modules such as a GUI module 106, an authentication module 108, a template module 110, and a conversion module 112. Additional or fewer modules can be included in the system 100. Each of the modules can be embodied as an application specific integrated circuit ("ASIC"), or a separately and specifically configured computing system as would be known to one of ordinary skill in the art with the present disclosure before them.

In some embodiments, the system 100 can communicate with, form part of, and/or be associated with user devices (e.g., smart phones, Apple iPhones, Samsung Galaxy, tablets, Apple iPads, Microsoft Surface Pros, etcetera), such as user device 116 that is located within the airport 10 over a network 114 that can comprise any public or private network infrastructure. By way of example, the network 114 can comprise a local WiFi network in the airport 10. It will be understood that the user device 116 can comprise any suitable end-user computing device, such as a smartphone, laptop, or other similar device.

In some embodiments, the system 100 can communicatively couple with the FBO 20 systems, methods, and operations over a wired or wireless connection, as would be known to one of ordinary skill in the art.

Referring once again to the system 100, the GUI module is configured to provide a plurality of different input user interfaces that allow users to interact with the system 100. In some embodiments, the GUIs can be embodied as an application that can be downloaded to execute on the user device 116. Example GUIs are illustrated and described in greater detail infra with respect to FIGS. 3A-3L.

In some embodiments, airport and/or FBO employees or agents can upload user-selected content into the system 100 to generate customized status dashboards and/or report files. In other embodiments, the end user can utilize their user device 116 to upload user-selected content and have the system 100 generate customized status dashboards and/or report files on-demand, on-the-fly, real-time, and near real-time, such as during normal FBO operations at the airport 10. The end user can utilize their user device to upload user-selected content into the system 100, and utilize the system 100 to generate customized status dashboards and/or report files.

The authentication module 108 can be executed to authenticate user login credentials and log user identifiers that are associated with instances of customized status dashboards and/or report files. In some embodiments, each airport can be associated with a unique identifier that allows an FBO employee to log into the system 100. An end user can be provided with similar credentials in embodiments where the user (e.g., supervisor, pilot, aircraft owner) is generating content on their own behalf.

In some embodiments, customized status dashboards and/or report files can be linked to the user credentials that were supplied when the user-supplied content was uploaded to the system 100.

After the user/airport/FBO has been authenticated, user-selected content can be uploaded to the system 100. In some embodiments, user-selected content can be any user provided content such as text, audio, video, photos, graphics, or other media—just to name a few.

The user can specify formatting options in some embodiments. These formatting options selectively modify how the user-selected content is displayed when the customized status dashboards and/or report files are generated.

In one embodiment, once the user-selected content has been uploaded, the system 100 begins the process of converting the user-selected content. In some embodiments, the template module 110 is executed to select templated media. The templated media forms a basis, both in textual, audio and/or video content for the customized status dashboards and/or report files. The status dashboards and/or report files can be customized when the user-selected content is integrated into templated media. In some embodiments, the template module 110 can evaluate a domain of the user-selected content and select the templated media that corresponds to the domain of the user-selected content. The template module 110 can evaluate, for example, metadata of the image and determine that the image is of an aircraft. The template module 110 can select templated media that corresponds to the aircraft or aircraft history.

In some embodiments, the user-selected content is integrated into specific locations in the templated media, such as anchor points. For example, the templated media can include a layout location where the user-selected content (e.g., data, image, etcetera) is placed into a template of the selected, templated media. Other layout locations can exist for text, photos, video clips, and so forth.

Once the templated media has been selected, the user-selected content is integrated into the templated media by the conversion module 112. That is, the user-selected content is placed into appropriate or pre-defined locations in the templated media. Some embodiments allow for formatting of the user-selected content.

Some customized status dashboards and/or report files and corresponding templated media comprises an advertisement or logo for the airport and/or FBO. Thus, in addition to incorporating the user-selected content, the customized status dashboards and/or report files can integrate an advertisement or logo for the airport and/or FBO. In an alternative embodiment, current weather, local or otherwise, can be integrated and/or incorporated.

After generating the customized status dashboards and/or report files, the customized status dashboards and/or report files can be stored locally and/or exported for display at the FBO 20.

In one or more embodiments, the customized status dashboards and/or report files can also be exported in a format that allows the customized status dashboards and/or report files to be distributed and displayed on a third-party platform, such as a social network, a collaborative network, or other similar system(s) and platform(s). In some embodiments, the system 100 can implement various application programming interfaces (APIs) that allow the conversion module to create and distribute platform specific customized digital cinema package files.

Referring now to FIG. 2, which illustrates a method that can be executed by the systems of the present disclosure. The method includes a step 202 of providing a portable electronic device, wherein the portable electronic device is preferably adapted to execute software that displays a graphical user interface (GUI). The method includes a step 204 of establishing a user identity preferably via the GUI. For example, the user can provide his/her email, username, and/or unique identification number in combination with a password. The method includes an optional step 206 of observing an inspection dashboard. In this step, the dashboard can include one or more of the number of arriving flights, departing flights, aircraft checked, aircraft inspected, and aircraft needing fuel and/or maintenance. The method includes a step 208 of establishing an aircraft's identity and location preferably via the GUI. In the step, the aircraft's identity is established by one or more of the aircraft's tail number, airport name, hangar name, gate number, GPS location, make and/or model of the aircraft. The method includes step 210 of defining an aviation service having a standard operating procedure to be carried out by the user preferably via the GUI. For example, the aviation services having standard operating procedures can include one or more of aircraft arrival, aircraft departure, aircraft inspection, aircraft maintenance, aircraft fueling, aircraft towing, aircraft parking, aircraft hangaring, and/or aircraft repositioning. The method includes a step 212 of prompting the user to collect at least one objective and/or subjective data input corresponding to the standard operating procedure of the aviation service being carried out by the user preferably via the GUI. Examples of subjective data include, but are not limited to, identifying the conditions (e.g., good, caution, or bad) of aircraft components (e.g., wheel, wing, fuselage, windshield, etcetera). Examples of objective data include, but are not limited to, a photo of the aircraft or portion thereof, a video of the aircraft or portion thereof, and/or a factual audio notation—noting the tire pressure or other quantitative data point. The method includes a step 214 of recording the date and time the data input was collected. The method also includes a step 216 of storing the collected data on the portable electronic device and/or uploading the collected data to an isolated and/or cloud-based server. In one implementation of the present invention, the method includes a step 218 of validating whether or not the user complied with the standard operating procedure of the aviation service that was carried out. The method may also include a step 220 of generating a status update of the aircraft at the specific date, time, and location. Such an update can be observed, for example, on the inspection dashboard as disclosed herein. The method may further include a step 222 of communicating the status update of the aircraft to one or more of the FBO's supervisor, the aircraft's pilot(s), the aircraft's passenger(s), and the aircraft's owner(s).

In one or more embodiments, the system 100 can generate runtime logs that track all input information and track system 100 operations such as templates selected, errors in customized status dashboards and/or report files, and so forth.

FIGS. 3.1-3.12 are screenshots of an example GUI that allows a user to carry out the methods of the present invention, including those identified supra with respect to FIG. 2.

In another embodiment, as noted above, the system can be utilized by a plurality of users, including FBO operators, FBO supervisors, FBO technicians, FBO employees, pilots, crew, and aircraft owners. In embodiments where the FBO employee is utilizing the systems of the present disclosure, an example method could include the following non-limiting steps.

FIG. 4 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed and desired to be secured by Letters Patent of the United States is:

1. A method for conducting fixed-base operator aviation services using a portable electronic device, comprising the steps of:
    providing a portable electronic device adapted to execute software that displays a graphical user interface (GUI);
    establishing a user identity via the GUI by receiving user email address and password credentials;
    establishing aircraft identity by receiving user input of an aircraft tail number via the GUI;
    establishing aircraft location by automatically obtaining GPS coordinates from the portable electronic device;
    defining an aviation service having a standard operating procedure selected from aircraft inspection or aircraft maintenance;
    prompting the user via the GUI to capture at least one photograph of a portion of the aircraft corresponding to the standard operating procedure;
    prompting the user via the GUI to select a condition status from good, caution, or bad for an inspection checkpoint, recording a date and time when the photograph and condition status are collected;
    storing the photograph, condition status, and associated date and time in a data record on the portable electronic device; and
    validating compliance with the standard operating procedure by receiving user confirmation that required inspection actions were completed.

2. A method for conducting fixed-base operator aviation services using a portable electronic device, comprising the steps of: providing a portable electronic device adapted to execute software that displays a graphical user interface (GUI), establishing a user identity via the GUI, displaying an inspection dashboard via the GUI showing a count of arriving aircraft, a count of departing aircraft, a count of aircraft inspected, and a count of aircraft needing fuel, selecting an aircraft for inspection from the dashboard, establishing aircraft identity by inputting an aircraft tail number, prompting the user to capture photographs of aircraft components via the GUI, prompting the user to select condition statuses of good, caution, or bad for multiple inspection checkpoints via the GUI, storing the photographs and condition statuses with date and time stamps on the portable electronic device, and updating the inspection dashboard count to reflect completion of the aircraft inspection.

3. A method for conducting fixed-base operator aviation services using a portable electronic device, comprising the steps of: providing a portable electronic device having a processor, memory, GPS unit, camera, and display, displaying a login interface via a graphical user interface (GUI) for receiving user email address and password, displaying dropdown menus via the GUI for selecting airport name and hangar name, receiving user input of an aircraft tail number via the GUI, automatically capturing GPS coordinates from the GPS unit of the portable electronic device, displaying an inspection checklist via the GUI with multiple checkboxes corresponding to aircraft components, prompting photograph capture via the camera for each aircraft component being inspected, displaying selectable condition options of good, caution, and bad for each aircraft component via the GUI, generating a digital inspection record combining the photographs, condition selections, GPS coordinates, and timestamps, and displaying validation checkboxes via the GUI for confirming completion of standard operating procedures.

* * * * *